United States Patent [19]

Mizusawa

[11] Patent Number: 4,653,616
[45] Date of Patent: Mar. 31, 1987

[54] DAMPER
[75] Inventor: Akira Mizusawa, Utsunomiya, Japan
[73] Assignee: Nifco, Inc., Yokohama, Japan
[21] Appl. No.: 772,366
[22] Filed: Sep. 4, 1985
[30] Foreign Application Priority Data
  Sep. 7, 1984 [JP] Japan .............................. 59-136063[U]
[51] Int. Cl.[4] ............................................. F16D 57/00
[52] U.S. Cl. .......................................... 188/290; 16/51;
  188/322.21; 188/322.5; 192/58 B
[58] Field of Search ............ 188/290, 291, 306, 322.21,
  188/322.5, 82.1, 83; 267/8 R, 64.28; 16/82, 51,
  54, DIG. 9; 192/58 B

[56] References Cited
U.S. PATENT DOCUMENTS

| 2,607,548 | 8/1952 | Hollander | 188/290 X |
| 3,651,903 | 3/1972 | Butler et al. | 188/290 |
| 3,678,782 | 7/1972 | Aoki | 188/322.5 X |
| 4,426,752 | 1/1984 | Nakayama | 16/82 |
| 4,513,473 | 4/1985 | Omata | 188/290 X |
| 4,527,675 | 7/1985 | Omata et al. | 188/290 |
| 4,565,266 | 1/1986 | Omata | 188/290 X |

FOREIGN PATENT DOCUMENTS

| 99539 | 6/1983 | Japan | 188/290 |
| 24545 | 2/1984 | Japan | . |

Primary Examiner—George E. A. Halvosa
Attorney, Agent, or Firm—Trexler, Bushnell & Wolters, Ltd.

[57]  ABSTRACT

A damper for braking the opening speed of the hatch of a cassette tape holder of a recorder comprises a rotary member such as a gear member and a supporting member for supporting the rotary member, a viscous substance for producing a braking torque being charged in a clearance between the rotary member and the supporting member. The damper is characterized by being provided with an injection opening for injecting the viscous substance into the clearance and an air-escape portion for allowing air contained in the clearance to escape, the air-escape portion being positioned remote from the injection opening, whereby the clearance can be uniformly charged with the viscous substance without air being mixed therewith.

4 Claims, 10 Drawing Figures

FIG.2 (A) (PRIOR ART)

DAMPER

FIELD OF THE INVENTION AND RELATED ART STATEMENT

The present invention relates to a damper adapted for use with an opening/closing portion such as the hatch of a cassette tape holder of a recorder or with such a portion of a console panel of a television in order to regulate mainly the opening speed of such opening/closing portion.

In such opening/closing portions as the hatch of a cassette tape holder or such a portion of the console panel of the television, when the user operates an ejection button thereof, the opening/closing portion is automatically opened by a spring member or the like. Such opening/closing portions are often provided with a damper in the opening/closing mechanism thereof in order to prevent the opening/closing portion from snapping open and making an impact noise on the completion of opening.

In general, a widely used type of the damper is provided with a gear member acting as a rotary member and a supporting member for supporting such gear member with grease being provided in one or more slide clearances between the gear member and the supporting member to act as a viscous substance for regulating the rotational movement of the gear member.

In FIGS. 1 and 2 showing an example of the conventional type of the damper which is disclosed in Japanese Utility Model Public Disclosure SHO 59-24545, a gear member 10 is rotatably supported by a supporting member 12. The gear member 10 is provided with a gear portion 16 in which teeth 14 are formed and a cylindrical insertion portion 18 which is inserted into the supporting member 12. The gear portion 16 and the cylindrical insertion portion 18 are integrally formed of a synthetic resin. The supporting member 12 is shaped as a cylinder closed at one end and is provided inside with a central circular column-like projection 20. The supporting member 12 is integrally formed of a synthetic resin. Although not shown in the drawings, a suitable bracket for mounting the damper on various types of instruments is integrally formed with the supporting member 12. Clearances 22 between the gear member 10 and the supporting member 12 are filled with grease.

In this conventional damper, the grease is applied to the gear member 10 or the supporting member 12 before they are assembled. It is naturally preferable to apply the grease to the whole sliding surface of the gear member 10 uniformly. However, since commonly used dampers are so small that the diameter of the gear member 10 is generally about 10 mm, it is hard to apply the grease uniformly to the whole sliding surface of the gear member 10 using an automated application process, while manual application is very time consuming.

Consequently, in the grease applying operation conducted, air generally gets mixed into the grease, making it impossible to apply the grease to the whole sliding surface of the gear member 10 of the damper. This makes the braking torque of the damper uneven, and constitutes a defect inherent in the conventional type of the damper.

OBJECT AND SUMMARY OF THE INVENTION

It is an object of the present invention to provide a damper whose clearance is uniformly filled with a viscous substance such as grease.

In the damper of the present invention, an injection opening for injecting the viscous substance is provided in a rotary member or a supporting member thereof, and an air-escape portion is provided at a position remote from the injection opening.

Consequently, the viscous substance injected into the damper through the injection opening pushes the air in the clearance of the damper out through the air-escape portion of the damper as the grease is charged into the clearance, so that the viscous substance is applied to all sliding surfaces of the damper uniformly.

BRIEF DESCRIPTION OF THE DRAWINGS

Other objects and features of the present invention will be clarified in the following detailed description of the present invention, with reference to the accompanying drawings.

FIG. 2(A) is a front view of the gear member of the conventional damper shown in FIG. 1;

FIG. 6 is an explanatory view of the assembly process of the damper of the present invention, wherein:

DESCRIPTION OF THE PREFERRED EMBODIMENT

Figure 1:
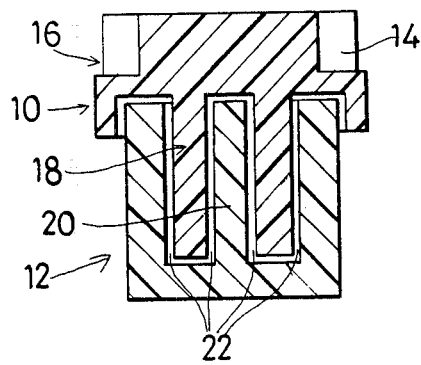
FIG. 1 is an enlarged sectional view of an example of a conventional damper.
Figure 3:
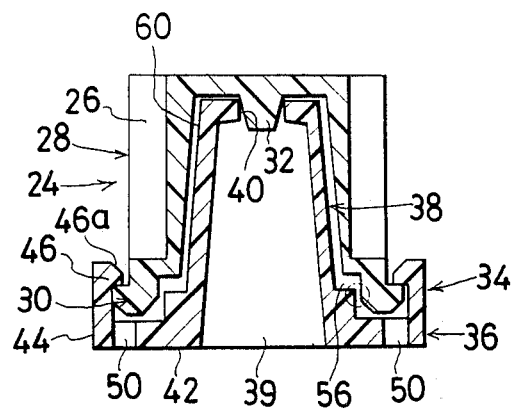
FIG. 3 is an enlarged sectional view of an embodiment of the damper of the present invention.
Figure 3:
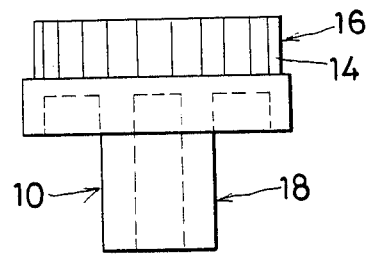
Figure 4A:
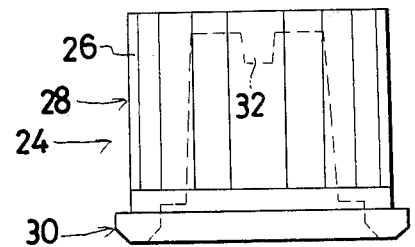
FIG. 4(A) is a front view of the gear member of the damper of the present invention, shown in FIG. 3.
Figure 2B:
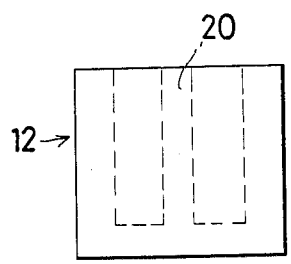
FIG. 2(B) is a front view of the supporting member of the conventional damper shown in FIG. 1.
Figure 4B:
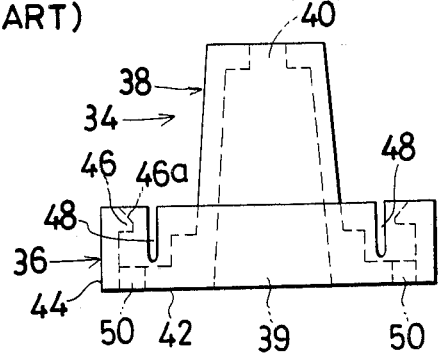
FIG. 4(B) is a front view of the supporting member of the damper of the present invention, shown in FIG. 3.

In FIGS. 3 and 4, there is shown an embodiment of the damper of the present invention. The damper is provided with a gear member 24 and a supporting member 34 for supporting the gear member 24. The gear member 24 is constructed of a gear portion 28 formed with teeth 26, and a flange portion 30. Further, the gear member 24 is provided with an internal cavity which opens on the flange portion side of the gear member 24 and has a stepped shape. The innermost step of the cavity is tapered toward the top wall of the gear member 24. At the center of the inner surface of the top wall is formed a projecting tapered shaft 32. The flange portion 30 is chamfered on both its inner and outer edges.

The supporting member 34 consists of a base 36 and a shaft 38 of stepped shape. The shaft 38 projects upward from the bass 36 as seen in FIGS. 3 and 4. The supporting member 34 has a cavity 39 which is fully open on the base side. The innermost step of the shaft 38 is tapered toward the tip of the shaft 38. Further, at the center portion of the tip of the shaft 38 is formed an opening 40 which communicates with the inside cavity 39.

Figure 5:
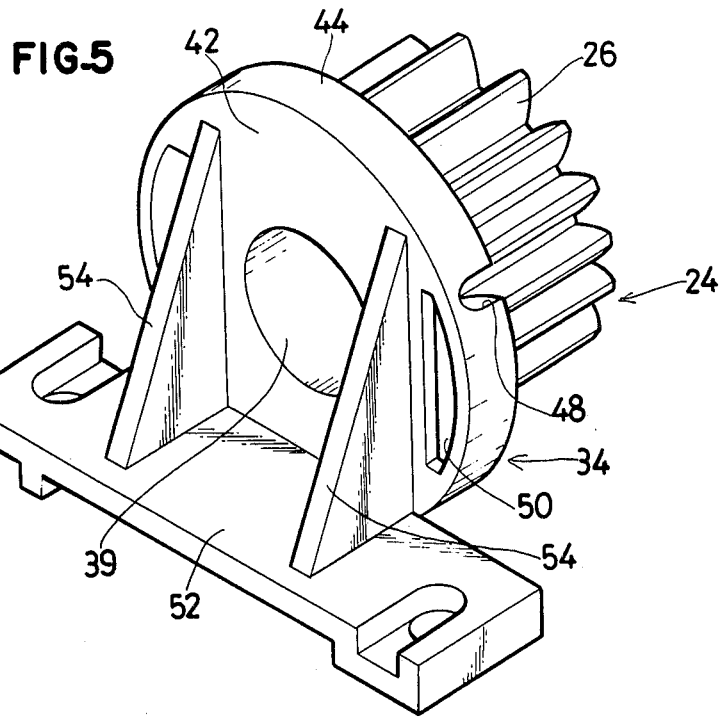
FIG. 5 is an enlarged perspective view of the damper of the present invention, shown in FIG. 3.

The base 36 of the supporting member 34 has a base plate 42 formed at its outer periphery with an upwardly projecting peripheral wall 44. The free end of the wall 44 is formed as an inwardly extending engaging edge 46. The upper surface of the engaging edge 46 forms an oblique surface 46a. In the peripheral wall 44 of the base plate 42, there are formed four notches 48 each of which extends downward from the top of the peripheral wall 44 and passes through the engaging edge 46. In the root portion of the peripheral wall 44, there are formed two substantially rectangular holes 50. As shown in FIG. 5, the back surface of the base plate 42 is provided with a bracket 52 and a pair of ribs 54 for connecting the base plate 42 with the bracket 52. The bracket and the ribs are not shown in FIGS. 3 and 4.

Figure 6B:
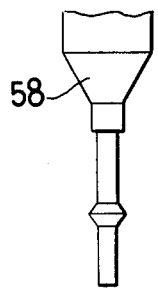
FIG. 6(B) is a view showing a grease gun approaching the thus assembled supporting member.
Figure 6A:
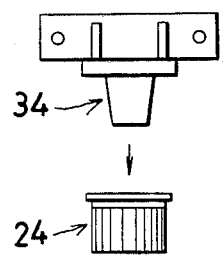
FIG. 6(A) is a view showing the step in which the supporting member is inserted into the gear member.
Figure 6C:
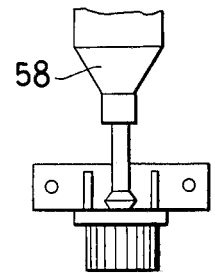
FIG. 6(C) is a view showing the grease gun inserted into the supporting member.

The gear member 24 and the supporting member 34 are made of a synthetic resin, each as a unitary body, and are assembled as shown in FIG. 6(A), whereafter a viscous substance such as grease is charged into the clearances of the thus assembled unit (the damper). The outer diameter of the flange portion 30 of the gear member 24 is larger than the inner diameter of the engaging edge 46 of the supporting member 34. However, since the engaging edge 46 of the supporting member 34 is provided with the notches 48, its inner diameter can be easily expanded to facilitate insertion of the supporting member 34 into the gear member 24 by forcing the flange portion 30 of the gear member 24 past the oblique surface 46a of the engaging edge 46. Further, after insertion of the supporting member 34 into the gear member 24, since the flange portion 30 of the gear member 24 is engaged with the engaging edge 46 as shown in FIG. 3, there is no danger of their becoming disassembled in use.

When the gear member 24 and the supporting member 34 are assembled, the shaft 32 of the gear member 24 is supported in the opening 40 of the supporting member 34 while the inner peripheral surface of the flange portion 30 is supported by the outer peripheral surface of the stepped base 36 of the supporting member 34. (The region of support is circled in FIG. 3.) Further, between the stepped portion of the cavity of the gear member 24 and the stepped portion of the shaft portion 38 of the supporting member 34, there is formed an excess grease reservoir 56 of relatively large size.

In the damper of the present invention, as shown in FIGS. 6(A) and 6(B), after the supporting member 34 is inserted into the gear member 24, a grease gun 58 is inserted into the cavity 39 of the supporting member 34 from the base portion side and is positioned by the shaft 32 of the gear member 24, and thereafter the grease is charged under pressure into the clearance between the supporting member 34 and the gear member 24 through the clearance between the shaft 32 of the gear member 24 and the opening 40 of the supporting member 34. At this time, injection of the grease is uniformly distributed around the shaft portion 32 of the gear member 24 and is radially fed under pressure to deeper portions of the clearance. The air present in the clearance between the supporting member 34 and the gear member 24 is pushed out by the grease and discharged into the atmosphere through the holes 50 formed in the base plate 42. It should be noted that although it is preferable to provide the holes 50 for discharging the air as is in this embodiment other arrangements are possible. Namely, the essential point of the damper of the present invention is to provide an air discharging opening or passage in a portion remote from the injection opening 40 for injecting the viscous substance, thereby making it possible to substantially completely discharge the air from the clearance between the supporting member 34 and the gear member 24. Any surplus grease injected is stored in the grease reservoir 56.

Consequently, the clearance 60 between the tapered inner wall of the gear member 24 and the tapered outer surface of the shaft 38 of the supporting member 34 is uniformly filled with grease free from any air mixed therewith. In this connection, although the top wall of the gear member 24 is urged upward under the injection pressure of the grease, there is no danger of this upward movement causing the damper to become disassembled because the flange portion 30 of the gear member 24 is engaged with the engaging edge 46 of the supporting member 34.

As described above, in this embodiment of the present invention, the grease injection opening 40 of the supporting member 34 is provided in a portion corresponding to the rotational center of the damper to make it possible to fill the clearance of the damper with the grease by means of the grease gun. Consequently, the grease is fed from the injection opening 40 of the supporting member 34 and is radially distributed into the clearance 60 between the supporting member 34 and the gear member 24 so that the clearance 60 is uniformly filled with the grease throughout. As a result, since the gear member 24 is rotatably supported by the supporting member 34 at its shaft 32 and flange portion 30, rotation of the gear member 24 is braked by a constant braking torque due to the viscosity of the grease charged in the clearance 60 between the members 24, 34.

Further, although in the conventional damper it is not possible to prevent air from being entrained in the grease, whereby it is impossible to conduct a uniform changing of the grease, in the damper of the present invention there is no danger of air being mixed with the grease because the air is forcibly discharged from the clearance 60 by the injection of the grease.

Further, in the damper of this embodiment of the present invention, it is possible to store any surplus grease injected in the grease reservoir 56 and also possible to feed the stored surplus grease to portions deficient in grease, so that uniform charging of grease is further enhanced.

Further, in the damper of this embodiment of the present invention, since the grease injection opening 40 is positioned at the innermost portion of the cavity 39, there is no danger of other parts around the damper of the present invention being dirtied by the grease even if the fed grease adheres to a portion around the injection opening 40 of the supporting member 34.

Further, in the damper of this embodiment of the present invention, since it is possible to conduct the grease filling operation by means of the grease gun 58 which can be operated by a mere linear reciprocating movement, it is possible to easily automate the process of assembling the damper.

Further, in the damper of this embodiment of the present invention, since it is possible to conduct the grease charging operation after the gear member 24 and the supporting member 34 are assembled, it is possible to stock the thus assembled dampers without grease charged therein. Consequently, it is possible to promptly satisfy various users' needs by injecting a grease of the viscosity required to obtain the braking torque required by each user.

In the damper of this embodiment of the present invention, although the injection opening 40 for injecting the viscous substance into the clearance 60 is provided at the center of the supporting member 34, it is also possible to provide the injection opening 40 in a center portion of rotation of the gear member 24 with respect to the supporting member 34 or in a portion near the center of one of the members 24 and 34.

Further, in the damper of this embodiment of the present invention, although the injection opening 40 is always open, it is possible to provide a suitable valve in the injection opening 40 so that reverse flow of the injected grease is prevented.

Further, in this embodiment of the present invention, although the grease is employed as the viscous substance, it is possible to employ other types of viscous substances in place of grease.

As described above, in the damper of this embodiment of the present invention, since the injection opening 40 for injecting the viscous substance is provided in the supporting member 34 or in the gear member 24 while the air-escape portion, such as the holes 50, is provided in a portion remote from the injection opening 40, it is possible to uniformly distribute the viscous substance to every portion of the clearance 60 between the rotary member 24 and the supporting member 34.

What is claimed is:

1. A damper comprising a rotary member having an axis of rotation and having a hollow substantially cylindrical portion closed at one end by an end wall and having an axial shaft projecting from said end wall into said hollow portion, and a supporting member for and coaxial with said rotary member, said supporting member having an axially extending hollow portion received within said rotary member hollow portion and including an end wall having an axial aperture through which said axial shaft extends with clearance, said rotary member and said supporting member being spaced apart, and a viscous substance disposed between said rotary member and said supporting member, said end wall axial aperture providing an injection port for said viscous substance, and at least one of said rotary member and said supporting member being provided with an air-escape means remote from said injection port.

2. A damper as set forth in claim 1 wherein said hollow portions have cooperating steps therein providing between them a reservoir for said viscous substance.

3. A damper as set forth in claim 1 wherein said supporting member hollow portion has an outer annular flange at the end thereof opposite said end wall with aperture means in said flange providing said air-escape means.

4. A damper as set forth in claim 3 wherein said supporting member has an outer cylindrical wall on said flange with inwardly projecting retaining means thereon, said rotary member having an outer flange interfitting with said retaining means to retain said rotary member on said supporting member.

* * * * *